United States Patent
Odaka

(10) Patent No.: US 9,522,849 B2
(45) Date of Patent: Dec. 20, 2016

(54) CERAMIC SINTERED BODY AND METHOD OF MANUFACTURING CERAMIC SINTERED BODY

(71) Applicant: BRIDGESTONE CORPORATION, Chuo-ku, Tokyo (JP)

(72) Inventor: Fumio Odaka, Kawagoe (JP)

(73) Assignee: BRIDGESTONE CORPORATION, Tokyo (JP)

(*) Notice: Subject to any disclaimer, the term of this patent is extended or adjusted under 35 U.S.C. 154(b) by 0 days.

(21) Appl. No.: 14/755,535

(22) Filed: Jun. 30, 2015

(65) Prior Publication Data
US 2015/0329429 A1   Nov. 19, 2015

Related U.S. Application Data

(62) Division of application No. 14/113,084, filed as application No. PCT/JP2012/060795 on Apr. 20, 2012, now abandoned.

(30) Foreign Application Priority Data

Apr. 21, 2011 (JP) .................. 2011-095255
Apr. 21, 2011 (JP) .................. 2011-095297

(51) Int. Cl.
   C04B 35/571 (2006.01)
   C04B 35/581 (2006.01)
   (Continued)

(52) U.S. Cl.
   CPC ........... *C04B 35/573* (2013.01); *C04B 35/575* (2013.01); *C04B 35/581* (2013.01); *C04B 35/63476* (2013.01); *C04B 35/645* (2013.01); *C04B 2235/3225* (2013.01); *C04B 2235/3826* (2013.01); *C04B 2235/3865* (2013.01);
   (Continued)

(58) Field of Classification Search
   CPC ............................ C04B 35/571; C04B 35/581
   See application file for complete search history.

(56) References Cited

U.S. PATENT DOCUMENTS

| 4,569,922 A | 2/1986 | Suzuki |
| 4,643,859 A * | 2/1987 | Mitomo ............. C01B 21/0685 264/125 |

(Continued)

FOREIGN PATENT DOCUMENTS

| CN | 1472136 A | 2/2004 |
| CN | 101177269 A | 5/2008 |

(Continued)

OTHER PUBLICATIONS

Communication dated Nov. 3, 2015 from the State Intellectual Property Office of People's Republic of China in counterpart Application No. 201410567780.8.

(Continued)

*Primary Examiner* — Karl Group
(74) *Attorney, Agent, or Firm* — Sughrue Mion, PLLC

(57) ABSTRACT

A ceramic sintered body according to the present invention comprises: silicon carbide and aluminum nitride, wherein a weight ratio of the aluminum nitride relative to a total weight ratio of the silicon carbide and the aluminum nitride is greater than 10% and 97% or smaller, and a bulk density is greater than 3.18 g/cm$^3$.

5 Claims, 5 Drawing Sheets

(51) Int. Cl.
*C04B 35/573* (2006.01)
*C04B 35/575* (2006.01)
*C04B 35/634* (2006.01)
*C04B 35/645* (2006.01)

(52) U.S. Cl.
CPC ..... *C04B 2235/3873* (2013.01); *C04B 2235/441* (2013.01); *C04B 2235/48* (2013.01); *C04B 2235/483* (2013.01); *C04B 2235/5436* (2013.01); *C04B 2235/77* (2013.01); *C04B 2235/80* (2013.01); *C04B 2235/96* (2013.01); *C04B 2235/9607* (2013.01); *C04B 2235/9669* (2013.01)

(56) References Cited

U.S. PATENT DOCUMENTS

| | | | |
|---|---|---|---|
| 4,777,155 | A | 10/1988 | Baba et al. |
| 4,796,077 | A | 1/1989 | Takeda et al. |
| 4,814,302 | A | 3/1989 | Matje et al. |
| 4,929,433 | A | 5/1990 | Hexemer, Jr. et al. |
| 4,985,225 | A | 1/1991 | Hashimoto et al. |
| 5,272,239 | A | 12/1993 | Jensen |
| 5,298,470 | A | 3/1994 | Chia et al. |
| 5,342,562 | A | 8/1994 | Cameron et al. |
| 6,251,353 | B1 | 6/2001 | Kajiwara et al. |
| 6,627,169 | B1 * | 9/2003 | Itoh ............... C01B 31/36 423/345 |
| 2001/0015509 | A1 | 8/2001 | Tiegs et al. |
| 2006/0014623 | A1 | 1/2006 | Mikijelj |

FOREIGN PATENT DOCUMENTS

| | | |
|---|---|---|
| CN | 101973532 A | 2/2011 |
| EP | 0 271 353 A2 | 6/1988 |
| GB | 2 170 511 A | 8/1986 |
| JP | 61-146761 A | 7/1986 |
| JP | 63-156075 A | 6/1988 |
| JP | 01239005 | * 9/1989 |
| JP | 02137711 | * 5/1990 |
| JP | 05-339057 A | 12/1993 |
| JP | 6-128035 A | 5/1994 |
| JP | 10-273306 A | 10/1998 |
| JP | 2002-16129 A | 1/2002 |
| JP | 2003-091809 A | 3/2003 |
| JP | 2009-94138 A | 4/2009 |
| WO | 2010008038 | * 1/2010 |

OTHER PUBLICATIONS

Bentsen et al, "Effect of Hot-Pressing Temperature on the Thermal Diffusvity/Conductivity of SiC/AlN Composites," *J. of Am. Ceramic Soc.*, vol. 66, No. 3, pp. C41-42 (Mar. 4, 1983).

Communication dated Dec. 4, 2014, issued by the European Patent Office in counterpart application No. 12773929.0.

Communication dated Jan. 20, 2015, issued by the Japanese Patent Office in counterpart application No. 2013-511079.

Communication dated Jun. 20, 2014, issued by the Chinese Patent Office in a counterpart application No. 201280029577.4.

International Search Report for PCT/JP2012/060795 dated Jul. 24, 2012.

Landon et al, "Thermal Conductivity of SiC-AlN Ceramic Materials," *J. Europ. Ceramic Soc.*, vol. 8, No. 5, pp. 271-77 (Jan. 1, 1991).

Preparation and Attenuating Properties of AlNSiC Microwave Attenuating Composites, *Powder Metallurgy Industry*, vol. 18, No. 4, Aug. 2008.

Rafaniello et al, "Fabrication and Characterization of SiC-AlN Alloys," *J. Mater. Sci.*, vol. 16, pp. 3479-88, 88 (1981).

Shimada et al, "Fabrication and characterisation of AlN-SiC ceramics by high-pressure hot-pressing," *Proc. First International Symp. Ceramic Components for Engine*, Oct. 17-19, 1983, KTK Scientific Publ. JP, pp. 466-472 (Jan. 1, 1984).

Extended European Search Report dated Apr. 28, 2015, issued by the European Patent Office in counterpart application No. 12773929.0.

* cited by examiner

CERAMIC SINTERED BODY AND METHOD OF MANUFACTURING CERAMIC SINTERED BODY

CROSS REFERENCE TO RELATED APPLICATIONS

This is a divisional of application No. 14/113,084 filed Oct. 21, 2013, now abandoned, which is a national stage of application No. PCT/JP2012/060795 filed Apr. 20, 2012, claiming priority based on Japanese patent application No. 2011-095255 filed Apr. 21, 2011 and Japanese patent application No. 2011-095297 filed Apr. 21, 2011, the contents of all of which are incorporated herein by reference in their entirety.

TECHNICAL FIELD

The present invention relates to a ceramic sintered body containing silicon carbide and aluminum nitride, and a method of manufacturing the ceramic sintered body.

BACKGROUND ART

Conventionally, a composite ceramic sintered body containing silicon carbide and aluminum nitride has been used as a member constituting an apparatus for manufacturing a semiconductor wafer because of its excellent properties such as high strength and heat resistance (for example, see Patent Literature 1).

CITATION LIST

Patent Literature

Patent Literature 1: Japanese Patent Application Publication No. 2009-094138

SUMMARY OF INVENTION

A ceramic sintered body generally has several improved properties in accordance with size of the bulk density. For this reason, a composite ceramic sintered body containing silicon carbide and aluminum nitride, which have high bulk density, has been required.

Further, in recent years, smaller energy consumption has been required as concerns to the environmental issue have been raised. An apparatus for manufacturing a semiconductor is often used under a high temperature condition such as a plasma etching process. For this reason, materials with excellent insulation have been used for a member constituting the apparatus for manufacturing a semiconductor, so that energy consumption for maintaining high temperature can be reduced.

However, the composite ceramic sintered body containing silicon carbide and aluminum nitride in the conventional technology has low insulation due to high thermal conductivity. Further, an insulation effect may be obtained by disposing an air layer called pore in the ceramic sintered body; however, there is a problem that its strength may be reduced. For this reason, a composite ceramic sintered body containing silicon carbide and aluminum nitride, which has excellent insulation, has been required.

The present invention has been made in view of such a situation, and an object thereof is to provide a composite ceramic sintered body containing silicon carbide and aluminum nitride, which has high bulk density and excellent insulation, and a method of manufacturing the ceramic sintered body.

In order to solve the aforementioned problem, the present invention has following features. The feature of the present invention is summarized as a ceramic sintered body comprising: silicon carbide and aluminum nitride, wherein a weight ratio of the aluminum nitride relative to a total weight ratio of the silicon carbide and the aluminum nitride is greater than 10% and 97% or smaller, and a bulk density is greater than 3.18 g/cm$^3$.

Furthermore, another feature of the present invention is summarized as a method of manufacturing a ceramic sintered body containing silicon carbide and aluminum nitride, comprising: a step of mixing a silicon-containing raw material containing a liquid silicon compound and a carbon-containing raw material containing an organic compound which produces carbon by heating, to produce a silicon carbide precursor; a step of heating and calcining the silicon carbide precursor under inert atmosphere to produce a silicon carbide raw material; a step of mixing an aluminum-containing raw material containing a hydrolyzable aluminum compound, a carbon-containing raw material containing an organic compound which produces carbon by heating, and water, to produce an aluminum nitride precursor; a step of heating and calcining the aluminum nitride precursor under nitrogen atmosphere to produce an aluminum nitride raw material; a step of mixing the silicon carbide raw material and the aluminum nitride raw material; and a step of sintering mixture of the silicon carbide raw material and the aluminum nitride raw material, wherein a weight ratio of the aluminum nitride relative to a total weight ratio of the silicon carbide and the aluminum nitride contained in the mixture of the silicon carbide raw material and the aluminum nitride raw material is greater than 10% and 97% or smaller.

Furthermore, another feature of the present invention is summarized as a method of manufacturing a ceramic sintered body containing silicon carbide and aluminum nitride, comprising: a step of mixing a silicon-containing raw material containing a liquid silicon compound, a carbon-containing raw material containing an organic compound which produces carbon by heating, an aluminum-containing raw material containing a hydrolyzable aluminum compound, and water, to produce a composite precursor; a step of heating and calcining the composite precursor under inert atmosphere containing nitrogen, to produce composite powder containing silicon carbide and aluminum nitride; and a step of sintering the composite powder, wherein a weight ratio of the aluminum nitride relative to a total weight ratio of the silicon carbide and the aluminum nitride contained in the composite powder is greater than 10% and 97% or smaller.

DESCRIPTION OF EMBODIMENT

Figure 1:
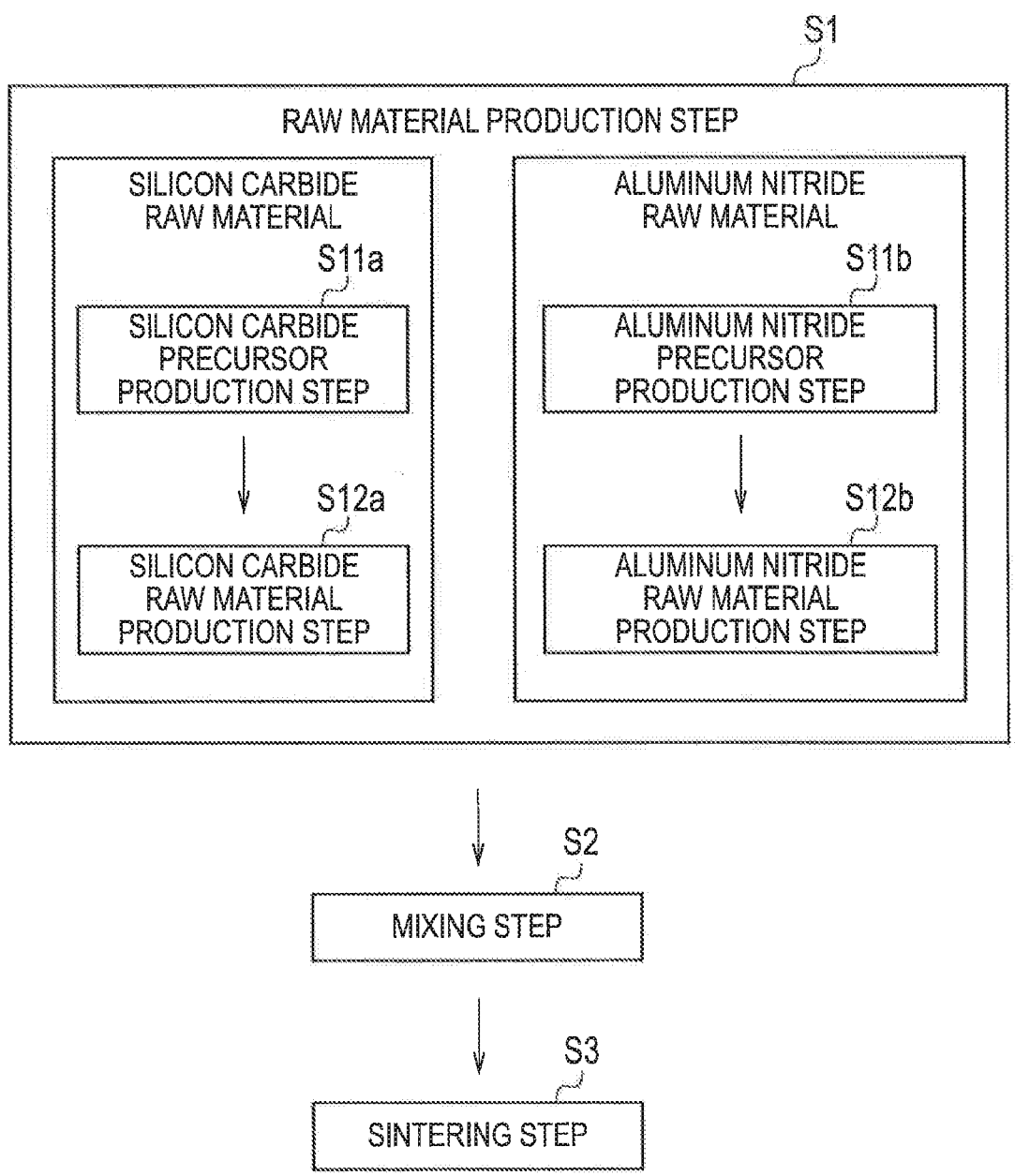
FIG. 1 is a flowchart for illustrating the method of manufacturing a ceramic sintered body according to the first embodiment.

With reference to the drawings, an example of a ceramic sintered body and a method of manufacturing a ceramic sintered body will be described in the order of (1) Ceramic sintered body, (2) Method of manufacturing ceramic sintered body according to first embodiment, (3) Method of manufacturing ceramic sintered body according to second embodiment and (4) Comparative Evaluations.

In the following description of the drawings, the same or similar reference numerals are used to designate the same or similar parts. It will be appreciated that the drawings are schematically shown and the ratio and the like of each dimension are different from the real ones. Therefore, a specific dimension should be determined in view of the following description. Moreover, among the drawings, the respective dimensional relations or ratios may differ.

(1) Ceramic Sintered Body

A ceramic sintered body according to the present embodiment will be described.

The ceramic sintered body contains silicon carbide and aluminum nitride. The ceramic sintered body has a bulk density greater than 3.18 g/cm$^3$. In the ceramic sintered body, a weight ratio of the aluminum nitride relative to a total weight ratio of the silicon carbide and the aluminum nitride is greater than 10% and 97% or smaller. A weight ratio of the aluminum nitride relative to a total weight ratio of the silicon carbide and the aluminum nitride is a value obtained by dividing a weight ratio of aluminum nitride by a total of a weight ratio of silicon carbide and a weight ratio of aluminum nitride ((weight ratio of AlN)/(weight ratio of SiC+weight ratio of AlN).

The ceramic sintered body preferably has a thermal conductivity of 65 W/mK or smaller. Further, the ceramic sintered body preferably has a thermal conductivity of 40 W/mK or smaller. In the ceramic sintered body, a weight ratio of the aluminum nitride relative to a total weight ratio of the silicon carbide and the aluminum nitride preferably is greater than 11% and 90% or smaller. In the ceramic sintered body, the weight ratio of the aluminum nitride relative to a total weight ratio of the silicon carbide and the aluminum nitride preferably is greater than 26% and 77% or smaller. This is because the ceramic sintered body that satisfies this range has a thermal conductivity of 40 W/mK or smaller.

The ceramic sintered body preferably has a bulk density greater than 3.23 g/cm$^3$. In the ceramic sintered body, it is preferable that the weight ratio of the aluminum nitride relative to a total weight ratio of the silicon carbide and the aluminum nitride is 52% or greater and 97% or smaller. In the ceramic sintered body, it is preferable that a weight ratio of the aluminum nitride relative to a total weight ratio of the silicon carbide and the aluminum nitride is greater than 76% and smaller than 96%. This is because the ceramic sintered body that satisfies this range has a bulk density greater than 3.23 g/cm$^3$ and a plasma resistance smaller than 10 μg/cm$^2$.

When the ceramic sintered body, which is a cuboid of 4 mm long, 3 mm wide, and 26 mm high, is subjected to three point bending test under a condition of a distance between spans of 20 mm and a crosshead speed of 5 mm/min, bending strength is preferably 700 MPa or greater. In the ceramic sintered body, it is preferable that a weight ratio of the aluminum nitride relative to a total weight ratio of the silicon carbide and the aluminum nitride is greater than 10% and 76% or smaller. In the ceramic sintered body, it is preferable that a weight ratio of the aluminum nitride relative to a total weight ratio of the silicon carbide and the aluminum nitride is greater than 10% and smaller than 52%. This is because the ceramic sintered body that satisfies this range has a bending strength of 700 MPa or greater.

In the ceramic sintered body, it is preferable that a weight ratio of the aluminum nitride relative to a total weight ratio of the silicon carbide and the aluminum nitride is 27% or greater and 97% or smaller. In the ceramic sintered body, it is preferable that a weight ratio of the aluminum nitride relative to a total weight ratio of the silicon carbide and the aluminum nitride is greater than 51% and 96% or smaller. This is because the ceramic sintered body that satisfies this range has a plasma resistance smaller than 40 μg/cm$^2$.

The ceramic sintered body preferably contains yttrium oxide. Further, the ceramic sintered body preferably contains a phenol resin.

The ceramic sintered body according to the present embodiment mainly contains silicon carbide and aluminum nitride. That is, the ceramic sintered body according to the present embodiment is formed of only silicon carbide and aluminum nitride, except a sintering aid and impurities.

(2) Method of Manufacturing Ceramic Sintered Body According to First Embodiment

Conventionally, a composite ceramic sintered body containing silicon carbide and aluminum nitride has been used as a member constituting an apparatus for manufacturing a semiconductor wafer because of its excellent properties such as high strength and heat resistance.

In the process of manufacturing a semiconductor wafer, for example, in etching process, plasma is generated by introducing high frequency in the presence of a halogen-based gas. For this reason, a member in the space where plasma is generated, specifically, a semiconductor-wafer-holding member such as an electrostatic chuck or a susceptor, is easily affected by plasma of a halogen-based gas, and specifically is easily corroded by plasma of a halogen-based gas.

The composite ceramic sintered body containing silicon carbide and aluminum nitride has high strength but low plasma resistance. For this reason, when the composite ceramic sintered body containing silicon carbide and aluminum nitride is used as a member constituting the apparatus of manufacturing a semiconductor wafer, quality of the semiconductor wafer may be reduced due to particles caused by corrosion.

Further, when the composite ceramic sintered body containing silicon carbide and aluminum nitride is used as a member affected by plasma as well as a member constituting the apparatus of manufacturing a semiconductor wafer, the member should be exchanged, for example, due to damage by corrosion.

For this reason, a composite ceramic sintered body containing silicon carbide and aluminum nitride, which has high strength and excellent plasma resistance has been required.

According to the method of manufacturing a ceramic sintered body according to the present embodiment, in particular, a composite ceramic sintered body containing silicon carbide and aluminum nitride, which has high strength and excellent plasma resistance can be provided.

The method of manufacturing a ceramic sintered body according to the present embodiment will be described with reference to FIG. 1. FIG. 1 is a flowchart for illustrating the method of manufacturing a ceramic sintered body according to the present embodiment. As shown in FIG. 1, the method of manufacturing a ceramic sintered body according to the present embodiment includes a raw material production step S1, a mixing step S2, and a sintering step S3.

(2. 1) Raw Material Production Step S1

The raw material production step S1 is a step of producing a silicon carbide raw material and an aluminum nitride raw material.

(2. 1A) Production of Silicon Carbide Raw Material (Silicon Carbide Powder)

The silicon carbide raw material is produced by a silicon carbide precursor production step S11a and a silicon carbide raw material production step S12a.

(2. 1A. 1) Silicon Carbide Precursor Production Step S11a

The silicon carbide precursor production step S11a is a step of producing a silicon carbide precursor. Firstly, a silicon-containing raw material containing a liquid silicon compound and a carbon-containing raw material containing an organic compound which produces carbon by heating are prepared.

[Silicon-containing Raw Material]

Examples of the silicon-containing raw material containing a liquid silicon compound (hereinafter, appropriately referred to as a silicon source) to be used include a liquid silicon compound described below. The silicon source using a solid silicon compound as well as a liquid silicon compound may be prepared.

Examples of the liquid silicon compound to be used include mono-, di-, tri-, or tetraalkoxysilane and a polymer of tetraalkoxysilane. Among alkoxysilanes, tetraalkoxysilane is used preferably. Specific examples thereof include methoxysilane, ethoxysilane, propoxysilane, and butoxysilane. From the viewpoint of handling, ethoxysilane is preferable. Examples of the polymer of tetraalkoxysilanes include a liquid silicon compound, which is a smaller molecular polymer (oligomer) having a polymerization degree of about 2 to 15 and a silicic acid polymer having a greater polymerization degree.

Examples of the solid silicon compound capable of being combined with a liquid silicon compound include silicon oxide. Examples of the silicon oxide include silica sol (colloidal ultrafine silica-containing liquid, in which an OH group or an alkoxyl group is included), and silicon dioxide (silica gel, fine silica, quartz powder), in addition to SiO.

Among these silicon compounds, from the viewpoint of homogeneity and handling, an oligomer of tetraethoxysilanes, and mixture of an oligomer of tetraethoxysilanes and fine silica particle, or the like are preferable.

[Carbon-containing Raw Material]

Examples of the carbon-containing raw material containing an organic compound which produces carbon by heating (hereinafter, appropriately referred to as a carbon source) include an organic compound described below. The carbon-containing raw materials are preferably a monomer, an oligomer, and a polymer, which contain at least one optional organic compound, which is synthesized by using a catalyst not including an impurity element, and polymerized or cross-linked to be cured by heating and/or using a catalyst or a cross-linking agent.

Preferable specific examples of the carbon-containing raw materials include a curable resin such as a phenol resin, a furan resin, a urea resin, an epoxy resin, an unsaturated polyester resin, a polyimide resin, or a polyurethane resin, which is synthesized by using a catalyst not including an impurity element. Particularly, a resol type or novolac type phenol resin with high residual carbon ratio and excellent workability is preferable.

The resol type phenol resin preferably used for the present embodiment is manufactured by reacting monovalent or divalent phenols such as phenol, cresol, xylenol, resorcinol, or bisphenol A, with aldehydes such as formaldehyde, acetaldehyde, or benzaldehyde in the presence of a catalyst (specifically, ammonia or organic amine) not including an impurity element.

The organic amine to be used as the catalyst may be any one of primary amine, secondary amine, and tertiary amine. Examples of the organic amine which can be used include dimethyl amine, trimethyl amine, diethyl amine, triethyl amine, dimethyl monoethanol amine, monomethyl diethanol amine, N-methyl aniline, pyridine, and morpholine.

A method of reacting phenols with aldehydes in the presence of ammonia or organic amine to compose a resol type phenol resin includes methods known in the conventional technology, except that a used catalyst is different.

That is, 1 to 3 moles of aldehydes and 0.02 to 0.2 moles of organic amine or ammonia, based on 1 mole of phenols, are mixed, and heated to between 60° C. and 100° C.

On the other hand, the novolac type phenol resin preferably used for the present embodiment can be manufactured by mixing the aldehydes with monovalent or divalent phenols described above, and then, reacted by using, as a catalyst, acids (specifically, hydrochloric acid, sulfuric acid, p-toluenesulfonic acid, oxalic acid, or the like) not including an impurity element.

The novolac type phenol resin also may be manufactured by using a method conventionally known. That is, 0.5 to 0.9 moles of aldehydes and 0.02 to 0.2 moles of inorganic acid or organic acid (not including an impurity element), based on 1 mole of phenols are mixed, and heated to between 60° C. and 100° C.

Subsequently, the prepared silicon source and carbon source are mixed. If necessary, a catalyst for polymerization or cross-link or a cross-linking agent (for example, aqueous maleic acid solution) is added to the mixture, and subjected to polymerization or cross-linking reaction, to produce a silicon carbide precursor. The resultant silicon carbide precursor may be allowed to dry using, for example, a hot plate.

(1. 1A. 2) Silicon Carbide Raw Material Production Step S12a

The silicon carbide raw material production step S12a is a step of heating and calcining a silicon carbide precursor under inert atmosphere to produce a silicon carbide raw material. Specifically, the silicon carbide precursor is carbonized and silicified by heating and calcining under the atmosphere of an inert gas. Examples of the inert gas include vacuum, nitrogen, helium, and argon.

In the silicon carbide raw material production step S12a, a silicon carbide precursor is heated and calcined to obtain a target silicon carbide raw material (hereinafter, appropriately referred to as silicon carbide powder). As one example of calcination condition, heating temperature is about 1600° C. to 2000° C., and calcination time is about 30 minutes to three hours. In addition, when the silicon carbide precursor is calcined, the following reaction occurs by using carbon contained in the silicon carbide precursor as a reducing agent:

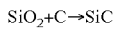

Silicon carbide powder is obtained by the above steps. When the resultant silicon carbide powder contains carbon, so called decarbonation, heating the silicon carbide powder at temperature 700° C. in an atmospheric furnace may be performed.

In order to reduce particle size of the silicon carbide powder, the silicon carbide powder may be pulverized using, for example, a jet mill so as to have a center particle size of 1 to 2 μm.

In addition, a method of obtaining highly pure silicon carbide powder may include the method of manufacturing silicon carbide powder described in "Method of manufacturing single crystal" in Japanese Unexamined Patent Application Publication No. H9-48605 previously applied by the present applicant. That is, the method includes a silicon carbide production step in which at least one selected from highly pure tetraalkoxysilane and a tetraalkoxysilane polymer is prepared as a silicon source, and a highly pure organic compound which produces carbon by heating is prepared as a carbon source, and then they are homogeneously mixed to obtain mixture, the mixture is calcined under inert atmosphere to obtain silicon carbide powder; and a post-treatment step in which the resultant silicon carbide powder is subjected to at least one heat treatment for 5 to 20 minutes in a temperature range of 2000° C. to 2100° C., while being maintained at a temperature of 1700° C. or greater and smaller than 2000° C. The two steps are performed and thereby silicon carbide powder can be obtained, in which the content of the respective impurity elements is 0.05 ppm or less.

(2. 1B) Production of Aluminum Nitride Raw Material (Aluminum Nitride Powder)

The aluminum nitride raw material is produced by an aluminum nitride precursor production step S11b and an aluminum nitride raw material production step S12b.

(2. 1B. 1) Aluminum Nitride Precursor Production Step S11b

The aluminum nitride precursor production step S11b is a step of producing an aluminum nitride precursor. Firstly, an aluminum-containing raw material containing a hydrolyzable aluminum compound and a carbon-containing raw material containing an organic compound which produces carbon by heating are prepared.

The aluminum-containing raw material (hereinafter, appropriately referred to as an aluminum source) containing the hydrolyzable aluminum compound may be a hydrolyzable aluminum compound. Specific examples of the hydrolyzable aluminum compound which can be used include liquid aluminum alkoxide.

Examples of the carbon-containing raw material containing an organic compound which produces carbon by heating which can be used include a carbon source described in a paragraph [Carbon-containing raw material]described above. A carbon source may be same or different as or from the carbon source which has been prepared for forming a silicon carbide precursor.

Subsequently, the prepared aluminum source, a carbon source, and water are mixed. This enables a liquid aluminum compound to be hydrolyzed, thus forming a hydrolysate, the hydrolysate and the carbon source are subjected to condensation reaction to generate an aluminum nitride precursor. When hydrolysis is effectively performed, a plurality of hydrolysates are produced, and therefore aluminum and carbon can be homogeneously dispersed in the mixture. In addition, the hydrolysate may be aluminum hydroxide.

If necessary, a catalyst which promotes the hydrolysis of the liquid aluminum compound may be added to the mixture. Further, an aqueous catalyst solution (for example, aqueous maleic acid solution) using a suitable catalyst as a solute may be added to the mixture. In this case, since the hydrolysis is performed by using water as a solvent of the aqueous catalyst solution, there is no need to directly add water to the mixture. Examples of the catalyst include any one of organic acid and inorganic acid.

The hydrolysis is performed while cooling, because heat is generated. Further, the step of mixing an aluminum source, a carbon source, and water may be easy, since they are mixed homogeneously even by stirring.

The resultant aluminum nitride precursor may be allowed to dry using, for example, a hot plate.

(2. 1B. 2) Aluminum Nitride Raw Material Production Step S12b

The aluminum nitride raw material production step S12b is a step of heating and calcining an aluminum nitride precursor under nitrogen atmosphere, to produce aluminum nitride raw material. The aluminum nitride precursor is subjected to carbonization and nitriding reduction by heating and calcining under nitrogen atmosphere. When the aluminum nitride precursor is heated and calcined, aluminum nitride is formed by the following reaction formula through aluminum oxide:

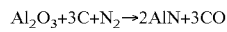

Therefore, a compounding ratio of an aluminum element to an carbon element may be determined on the basis of the reaction formula. That is, Al/C ratio is 0.67. The amount of each raw material is controlled on the basis of this ratio.

As one example of calcination condition, heating temperature is preferably about 1500° C. to 2000° C. Further, calcination time is preferably about 30 minutes to 10 hours.

Fine nitride aluminum powder is produced by the above steps. When the resultant aluminum nitride powder contains carbon, so called decarbonation, heating the aluminum nitride powder at temperature 700° C. in an atmospheric furnace may be performed.

In order to reduce particle size of the aluminum nitride powder, for example, the silicon carbide powder may be pulverized using a jet mill so as to have a center particle size of 1 to 2 μm.

(2. 2) Mixing Step S2

The mixing step S2 is a step of mixing the silicon carbide raw material and the aluminum nitride raw material. The silicon carbide powder and aluminum nitride powder obtained in the aforementioned step S1 are mixed to obtain a slurry-like mixture.

A weight ratio of the aluminum nitride relative to a total weight ratio of the silicon carbide raw material and the aluminum nitride raw material contained in the mixture of the silicon carbide raw material and the aluminum nitride raw material is greater than 10% and 97% or smaller. It is preferable that the silicon carbide powder and aluminum nitride powder are mixed such that a weight ratio (silicon carbide/aluminum nitride) of the silicon carbide powder to the aluminum nitride powder contained in the mixture of the silicon carbide powder and the aluminum nitride powder is in a range of 75/25 or greater and 90/10 or smaller. It is preferable that a weight ratio of the aluminum nitride raw material relative to a total weight ratio of the silicon carbide raw material and the aluminum nitride raw material contained in the mixture of the silicon carbide raw material and the aluminum nitride raw material is 10% or greater and 51% or smaller.

The slurry-like mixture may be formed using water, lower alcohols such as ethyl alcohol, ethyl ether, acetone, or the like as a solvent. The solvent in which the content of impurity is low is preferably used. A defoamer such as silicon can be also added.

Further, when slurry-like mixture is formed from aluminum nitride powder and silicon carbide powder, an organic binder may be added thereto. Examples of the organic binder include a polyacrylic acid resin, a deflocculant, and a powder adhesive.

The deflocculant to be used is preferably a nitrogen-based compound, from the viewpoint of more improving effect imparting a conductivity. For example, ammonia, polyacrylic acid ammonium salt or the like is preferably used. The powder adhesive to be used is preferably a polyvinyl alcohol resin, or the like.

Further, a phenol resin that is a non-metal-based sintering aid as a sintering aid of the silicon carbide powder, and yttrium oxide ($Y_2O_3$) as a sintering aid of the aluminum nitride powder preferably is added to the slurry-like mixture. The phenol resin is preferably a resol-type phenol resin.

The phenol resin that is a non-metal-based sintering aid may be dissolved in an organic solvent to be used. The non-metal-based sintering aid solution, the yttrium oxide, the silicon carbide powder, and the aluminum nitride powder may be mixed. The organic solvent which can be selected includes lower alcohols such as ethyl alcohol, and acetone.

For example, the resultant slurry-like mixture is allowed to dry on a hot plate. Mixture of the silicon carbide powder and the aluminum nitride powder can be obtained by drying. If necessary, the mixed powder is separated by a sieve.

(2. 3) Sintering Step S3

The sintering step S3 is a step of sintering the mixture of the silicon carbide raw material and the aluminum nitride raw material. Specifically, the mixed powder of the silicon carbide powder and the aluminum nitride powder is injected into a mold, and then sintered by hot pressing. The mold is pressed in a surface pressure of 150 kg/cm² to 350 kg/cm² while being heated. Heating temperature is preferably 1700° C. to 2200° C. The heating furnace is filled with inert atmosphere.

The ceramic sintered body according to the present embodiment can be manufactured by the above steps. The ceramic sintered body according to the present embodiment consists only of a complex of silicon carbide and aluminum nitride, and a sintering aid, except impurities.

(2.4) Operation and Effect

According to the above-described method of manufacturing a ceramic sintered body according to the present embodiment, the silicon carbide precursor production step S11a of mixing a silicon source and a carbon source to produce a silicon carbide precursor, the silicon carbide raw material production step S12a of heating and calcining a silicon carbide precursor under inert atmosphere to produce a silicon carbide powder, the aluminum nitride precursor production step S11b of mixing an aluminum source, a carbon source, and water to produce an aluminum nitride precursor, the aluminum nitride powder production step S12b of heating and calcining an aluminum nitride precursor under nitrogen atmosphere to produce aluminum nitride powder, the mixing step S2 of mixing the silicon carbide powder and the aluminum nitride powder, and the sintering step S3 of sintering the mixed powder of the silicon carbide powder and the aluminum nitride powder are prepared.

Further, a weight ratio of the aluminum nitride relative to a total weight ratio of the silicon carbide and the aluminum nitride contained in the mixture of the silicon carbide raw material and the aluminum nitride raw material is greater than 10% and 97% or smaller.

The ceramic sintered body according to the present embodiment has a greater density than a ceramic sintered body manufactured by mixing silicon carbide powder and aluminum nitride produced by conventional method, because the silicon carbide powder produced from the silicon carbide precursor and the aluminum nitride produced from the aluminum nitride precursor each are composed by a single molecule. Specifically, the ceramic sintered body according to the present embodiment has a bulk density greater than 3.18 g/cm³.

Figure 2:
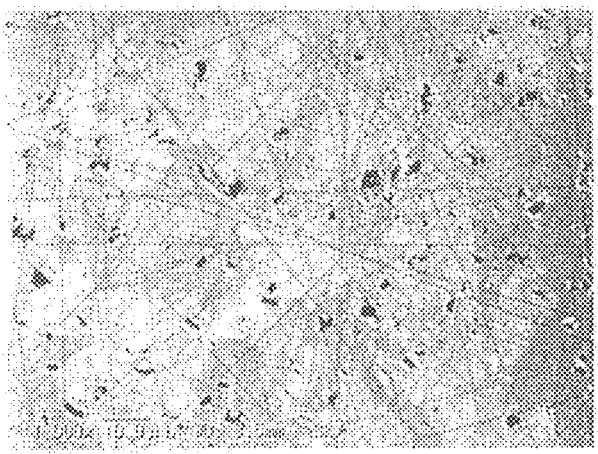
FIG. 2(a) is a diagram showing a photograph of the surface of a silicon carbide ceramic sintered body.
FIG. 2(b) is a diagram showing a photograph of the surface of the ceramic sintered body (Example 1 described below), in which a weight ratio of the aluminum nitride relative to a total weight ratio of the silicon carbide and the aluminum nitride is 10.6%.
Figure 2:
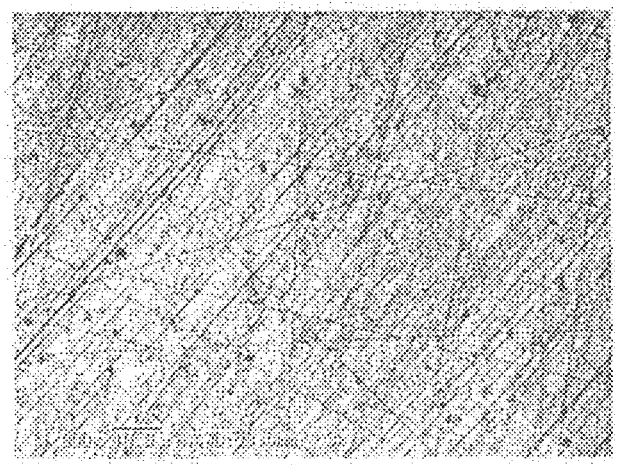

FIG. 2(a) is a diagram showing a photograph of the surface of a silicon carbide ceramic sintered body. That is, FIG. 2(a) is a diagram showing a photograph of the surface of a silicon carbide ceramic sintered body not including aluminum. The silicon carbide ceramic sintered body is manufactured by using, as raw material, the silicon carbide powder produced by heating and calcining the silicon carbide precursor. FIG. 2(b) is a diagram showing a photograph of the surface of the ceramic sintered body (Example 1 described below), in which a weight ratio of the aluminum nitride relative to a total weight ratio of the silicon carbide and the aluminum nitride is 10.6%.

A conventional silicon carbide ceramic sintered body forms a plurality of pores because the silicon carbide is sintered in solid phase (see FIG. 2(a)). The ceramic sintered body according to the present embodiment may sinter mixed powder obtained by mixing the silicon carbide powder and the aluminum nitride powder. The aluminum nitride is dispersed easily because it is sintered in liquid phase, and thus pores are hardly formed. For this reason, the ceramic sintered body according to the present embodiment includes pores of which the number and the size are reduced (see FIG. 2(b)). Since a sintered body is generally damaged by plasma from the portion in which pores is formed, in a case of the ceramic sintered body having the reduced number and size of pores according to the present embodiment, plasma resistance is improved. Further, since pores are hardly formed, a denser ceramic sintered body is formed, which has high strength.

In addition, since the silicon carbide powder and aluminum nitride powder according to the present embodiment use silicon carbide powder produced from the silicon carbide precursor and aluminum nitride powder produced from aluminum nitride precursor, they are micronized, and dispersed homogeneously. The silicon carbide powder and aluminum nitride powder are preferably mixed, and thus pores are hardly formed all over the ceramic sintered body. In addition, ratio of bonds generated between the silicon carbide powder and the aluminum nitride powder is increased by excellent dispersion and thus a denser ceramic sintered body is obtained. Therefore, damage by plasma is suppressed and strength is improved.

Further, it is preferable that a weight ratio (silicon carbide/ aluminum nitride) of the silicon carbide powder to the aluminum nitride powder contained in the mixed powder of the silicon carbide powder and the aluminum nitride powder is in a range of 75/25 or greater and 90/10 or smaller. It is preferable that a weight ratio of the aluminum nitride relative to a total weight ratio of the silicon carbide and the aluminum nitride contained in the mixture of the silicon carbide raw material and the aluminum nitride raw material is greater than 10% and 51% or smaller. When a ratio of the aluminum nitride is increased, the ceramic sintered body is further turned into a solid solution state and thus particle sizes of aluminum nitride are significantly increased. When a weight ratio of the silicon carbide powder to the aluminum nitride powder is 75/25 or greater and 90/10 or smaller, or a weight ratio of the aluminum nitride relative to a total weight ratio of the silicon carbide and the aluminum nitride contained in the mixture of the silicon carbide raw material and the aluminum nitride raw material is greater than 10% and 51% or smaller, particle size of aluminum nitride are suppressed from increasing, ratio of bonds generated between silicon carbide powder and aluminum nitride powder is suppressed from reducing. As a result, a ceramic sintered body having improved strength can be manufactured.

(3) Method of Manufacturing Ceramic Sintered Body According to Second Embodiment Conventionally, a composite ceramic sintered body containing silicon carbide and aluminum nitride is known as a material having high strength. The ceramic sintered body is used as, for example, a member constituting an apparatus of manufacturing a semiconductor, because of its high strength.

However, the composite ceramic sintered body containing silicon carbide and aluminum nitride has high strength, but low insulation due to high thermal conductivity. For this reason, a composite ceramic sintered body containing silicon carbide and aluminum nitride, which has excellent insulation and high strength has been required.

The method of manufacturing a ceramic sintered body according to the present embodiment can provide a composite ceramic sintered body containing silicon carbide and aluminum nitride, which has high strength and excellent insulation.

Figure 3:
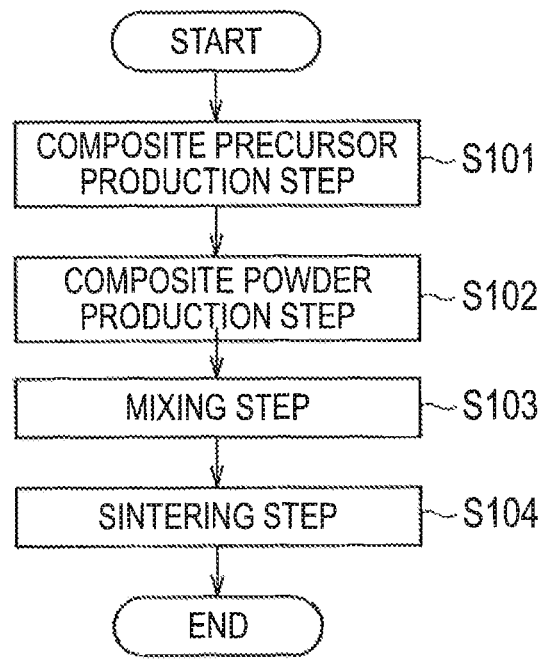
FIG. 3 is a flowchart for illustrating the method of manufacturing a ceramic sintered body according to the second embodiment.

The method of manufacturing a ceramic sintered body according to the present embodiment will be described with reference to FIG. 3. FIG. 3 is a flowchart for illustrating the method of manufacturing a ceramic sintered body according to the present embodiment. As shown in FIG. 3, the method of manufacturing a ceramic sintered body according to the present embodiment includes a composite precursor production step S101, a composite powder production step S102, a mixing step S103, and a sintering step S104.

(3. 1) Composite Precursor Production Step S101

The composite precursor production step S101 is a step of producing a composite precursor. Specifically, a silicon-containing raw material, a carbon-containing raw material, an aluminum-containing raw material, and water are mixed to produce a composite precursor.

Firstly, a silicon-containing raw material containing a liquid silicon compound, a carbon-containing raw material containing an organic compound which produces carbon by heating are prepared, and an aluminum-containing raw material containing a hydrolyzable aluminum compound, and water are prepared. An silicon-containing raw material, a carbon-containing raw material, and an aluminum-containing raw material are prepared by the following method. Water may be an aqueous solution in which a catalyst is contained.

Subsequently, the prepared silicon-containing raw material, the carbon-containing raw material, the aluminum-containing raw material, and the water are mixed. A mixing method is not limited, but in order that the silicon-containing raw material and the carbon-containing raw material are mixed and then easily subjected to polymerization or cross-linking reaction, or that the aluminum-containing raw material, the carbon-containing raw material, and the water are mixed, a liquid aluminum compound is hydrolyzed to form a hydrolysate, the hydrolysate and the carbon source are easily subjected to condensation reaction, the following method is preferable.

Firstly, a silicon-containing raw material and a carbon-containing raw material are mixed. If necessary, a catalyst for polymerization or cross-link or a cross-linking agent (for example, aqueous maleic acid solution) may be added to the mixture. Subsequently, an aluminum-containing raw material and a carbon-containing raw material are mixed with the mixture. The aluminum-containing raw material and the carbon-containing raw material are mixed with the mixture, and then water is added thereto. If necessary, a catalyst which promotes the hydrolysis of the liquid aluminum compound may be added to the mixture. Further, an aqueous catalyst solution (for example, aqueous maleic acid solution) using a suitable catalyst as a solute may be added to the mixture. In this case, since the hydrolysis is performed using water as a solvent for the aqueous catalyst solution, there is no need to add water to the mixture. Examples of the catalyst promoting hydrolysis which can be used include any one of organic acid and inorganic acid.

The amounts of the silicon-containing raw material, the carbon-containing raw material, and the aluminum-containing raw material are controlled such that a weight ratio of the aluminum nitride relative to a total weight ratio of the silicon carbide and the aluminum nitride contained in the composite powder is greater than 10% and 97% or smaller. It is preferable that the amounts of the silicon-containing raw material, the carbon-containing raw material, and the aluminum-containing raw material are controlled such that a weight ratio (i.e., silicon carbide/aluminum nitride) of the silicon carbide to the aluminum nitride contained in the composite powder is in a range of 25/75 or greater and 75/25 or smaller. It is more preferable that the amounts of the silicon-containing raw material, the carbon-containing raw material, and the aluminum-containing raw material are controlled such that a weight ratio of the aluminum nitride relative to a total weight ratio of the silicon carbide and the aluminum nitride contained in the composite powder is greater than 11% and 90% or smaller.

The silicon-containing raw material, the carbon-containing raw material, the aluminum-containing raw material, and the water are mixed to produce a composite precursor. The resultant composite precursor may be allowed to dry using, for example, a hot plate.

In addition, the composite precursor includes a silicon carbide precursor which produces silicon carbides by heating and calcining under inert atmosphere, and an aluminum nitride precursor which produces aluminum nitride by heating and calcining under inert atmosphere containing nitrogen.

(3. 1A) Silicon-containing Raw Material

Examples of the silicon-containing raw material containing a liquid silicon compound (hereinafter, appropriately referred to as a silicon source) to be used include a liquid silicon compound described below. The silicon source using a solid silicon compound as well as a liquid silicon compound may be prepared.

Examples of the liquid silicon compound to be used include mono-, di-, tri-, or tetraalkoxysilane and a polymer of tetraalkoxysilane. Among alkoxysilanes, tetraalkoxysilane is used preferably. Specific examples thereof include methoxysilane, ethoxysilane, propoxysilane, and butoxysilane. From the viewpoint of handling, ethoxysilane is preferable. Examples of the polymer of tetraalkoxysilanes include a liquid silicon compound, which is a smaller molecular polymer (oligomer) having a polymerization degree of about 2 to 15 and a silicic acid polymer having a greater polymerization degree.

Examples of the solid silicon compound capable of being combined with a liquid silicon compound include silicon oxide. Examples of the silicon oxide include silica sol (colloidal ultrafine silica-containing liquid, in which an OH group or an alkoxyl group is included), and silicon dioxide (silica gel, fine silica, quartz powder), in addition to SiO.

Among these silicon compounds, from the viewpoint of homogeneity and handling, an oligomer of tetraethoxysilanes, and mixture of an oligomer of tetraethoxysilanes and fine silica particle, or the like are preferable.

(3. 1.B) Carbon-containing Raw Material

Examples of the carbon-containing raw material containing an organic compound which produces carbon by heating (hereinafter, appropriately referred to as a carbon source) include an organic compound described below. The carbon-containing raw materials are preferably a monomer, an oligomer, and a polymer, which contain at least one optional organic compound, which is synthesized by using a catalyst not including an impurity element, and polymerized or cross-linked to be cured by heating and/or using a catalyst or a cross-linking agent.

Preferable specific examples of the carbon-containing raw materials include a curable resin such as a phenol resin, a furan resin, a urea resin, an epoxy resin, an unsaturated polyester resin, a polyimide resin, or a polyurethane resin, which is synthesized by using a catalyst not including an impurity element. Particularly, a resol type or novolac type phenol resin with high residual carbon ratio and excellent workability is preferable.

The resol type phenol resin preferably used for the present embodiment is manufactured by reacting monovalent or divalent phenols such as phenol, cresol, xylenol, resorcinol, or bisphenol A, with aldehydes such as formaldehyde, acetaldehyde, or benzaldehyde in the presence of a catalyst (specifically, ammonia or organic amine) not including an impurity element.

The organic amine to be used as the catalyst may be any one of primary amine, secondary amine, and tertiary amine. Examples of the organic amine which can be used include dimethyl amine, trimethyl amine, diethyl amine, triethyl amine, dimethyl monoethanol amine, monomethyl diethanol amine, N-methyl aniline, pyridine, and morpholine.

A method of reacting phenols with aldehydes in the presence of ammonia or organic amine to compose a resol type phenol resin includes methods known in the conventional technology, except that a used catalyst is different.

That is, 1 to 3 moles of aldehydes and 0.02 to 0.2 moles of organic amine or ammonia, based on 1 mole of phenols, are mixed, and heated to between 60° C. and 100° C.

On the other hand, the novolac type phenol resin preferably used for the present embodiment can be manufactured by mixing the aldehydes with monovalent or divalent phenols described above, and then, reacted by using, as a catalyst, acids (specifically, hydrochloric acid, sulfuric acid, p-toluenesulfonic acid, oxalic acid, or the like) not including an impurity element.

The novolac type phenol resin also may be manufactured by using a method conventionally known. That is, 0.5 to 0.9 moles of aldehydes and 0.02 to 0.2 moles of inorganic acid or organic acid (not including an impurity element), based on 1 mole of phenols are mixed, and heated to between 60° C. and 100° C.

(3. 1C) Aluminum-containing Raw Material

Examples of aluminum-containing raw material (hereinafter, appropriately referred to as an aluminum source) containing a hydrolyzable aluminum compound to be used include a liquid aluminum alkoxide. Specific examples of the liquid aluminum alkoxide include aluminum diisopropylate mono secondary butyrate $(Al(O\text{-}iC_3H_7)_2(o\text{-}secC_4H_9))$.

(1. 2) Composite Powder Production Step S102

The composite powder production step S102 is a step of producing a composite powder. Specifically, the composite precursor is heated and calcined under inert atmosphere containing nitrogen to produce composite powder containing silicon carbide and aluminum nitride.

As one example of calcination condition, heating temperature is preferably about 1500° C. to 2000° C. Further, calcination time is preferably about 30 minutes to 10 hours.

In order to form inert atmosphere, nitrogen may be used, or an inert gas containing nitrogen may be used. Examples of the inert gas include vacuum, helium, or argon.

When the composite precursor is heated and calcined, a silicon carbide precursor contained in the composite precursor is subjected to carbonization and silicification, and the aluminum nitride precursor contained in the composite precursor is subjected to carbonization and nitriding reduction.

Specifically, when the composite precursor is heated and calcined, the following reaction occurs using carbon contained in the silicon carbide precursor as a reducing agent:

$$SiO_2 + C \rightarrow SiC$$

Further, when the composite precursor is heated and calcined, in the aluminum nitride precursor, the following reaction occurs through aluminum oxide:

$$Al_2O_3 + 3C + N_2 \rightarrow 2AlN + 3CO$$

Therefore, a compounding ratio of a silicon element to a carbon element, and a compounding ratio of an aluminum element to a carbon element may be determined on the basis of the reaction formulas. That is, Si/C ratio is 1, and Al/C ratio is 0.67. The amount of each raw material is controlled on the basis of this ratio. Specifically, the amounts of the silicon-containing raw material, the carbon-containing raw material, and the aluminum-containing raw material are controlled such that a weight ratio (silicon carbide/aluminum nitride) of the silicon carbide to the aluminum nitride contained in the composite powder is in a range of 25/75 to 75/25.

Fine composite powder including a silicon carbide powder and an aluminum nitride powder is produced by the reaction. When the resultant composite powder contains carbon, so called decarbonation, heating and calcining the composite powder at, for example, temperature 700° C. in an atmospheric furnace may be performed.

In order to reduce particle size of the composite powder, the composite powder may be pulverized using, for example, a jet mill so as to have a center particle size of 1 to 2 μm.

(3. 3) Mixing Step S103

The mixing step S103 is a step of mixing a sintering aid with a composite powder. Further, a phenol resin as a sintering aid of silicon carbide powder is mixed, and yttrium oxide $(Y_2O_3)$ as a sintering aid of the aluminum nitride powder may preferably be mixed. The phenol resin is preferably a resol-type phenol resin. The phenol resin that is a non-metal-based sintering aid may be dissolved in an organic solvent to be used. The organic solvent which can be selected includes lower alcohols such as ethyl alcohol, and acetone.

In order that the sintering aid is mixed homogeneously with the composite powder, water, lower alcohols such as ethyl alcohol, ethyl ether, acetone, or the like can be used as a solvent. The solvent in which the content of impurity is low is preferably used. A defoamer such as silicon can be also added. When a solvent is used, a slurry-like mixture is obtained. The resultant slurry-like mixture is allowed to dry using, for example, a hot plate. Thus, a composite powder containing a sintering aid is obtained. If necessary, the composite powder is separated by a sieve.

(3. 4) Sintering Step S104

The sintering step S104 is a step of sintering a composite powder. Specifically, the composite powder is injected into a mold, and then sintered by hot pressing. The mold is pressed in a surface pressure of 150 kg/cm$^2$ to 350 kg/cm$^2$ while being heated. Heating temperature is preferably 1700° C. to 2200° C. The heating furnace is filled with inert atmosphere.

The ceramic sintered body according to the present embodiment can be manufactured by the above steps. The ceramic sintered body according to the present embodiment consists only of a complex of silicon carbide and aluminum nitride, and a sintering aid, except impurities.

(3.5) Operation and Effect

According to the method of manufacturing a ceramic sintered body according to the present embodiment described above, the step of mixing a silicon-containing raw material, a carbon-containing raw material, an aluminum-containing raw material, and water to produce a composite precursor, the step of heating and calcining the composite precursor under inert atmosphere containing nitrogen to produce a composite powder containing silicon carbide and aluminum nitride, and the step of sintering the composite powder are prepared. Herein, a weight ratio of the aluminum nitride relative to a total weight ratio of the silicon carbide and the aluminum nitride contained in the composite powder is greater than 10% and 97% or smaller.

The ceramic sintered body according to the present embodiment has a greater density than a ceramic sintered body manufactured by mixing silicon carbide powder and aluminum nitride produced by conventional method, because the silicon carbide powder produced from the silicon carbide precursor and the aluminum nitride produced from the aluminum nitride precursor each are composed by a single molecule. Specifically, the ceramic sintered body according to the present embodiment has a bulk density greater than 3.18 g/cm$^3$.

A conventional silicon carbide ceramic sintered body forms a plurality of pores because the silicon carbide is sintered in solid phase. The ceramic sintered body according to the present embodiment may sinter mixed powder obtained by mixing the silicon carbide powder and the aluminum nitride powder. The aluminum nitride is dispersed easily because it is sintered in liquid phase, and thus pores are hardly formed. For this reason, the ceramic sintered body according to the present embodiment includes pores of which the number and the size are reduced. For this reason, a denser ceramic sintered body is formed, which has high strength. In addition, since the silicon-containing raw material, the carbon-containing raw material, the aluminum-containing raw material, and water are mixed to produce a composite precursor, the composite powder produced from the composite precursor includes silicon carbide and aluminum nitride dispersed homogeneously in a molecular level. For this reason, pores are hardly formed all over the ceramic sintered body. In addition, ratio of bonds generated between the silicon carbide powder and the aluminum nitride powder is increased by excellent dispersion and thus a denser ceramic sintered body is obtained. For this reason, strength is improved.

When composite powder in which a weight ratio of the aluminum nitride relative to a total weight ratio of the silicon carbide and the aluminum nitride contained in the composite powder is greater than 11% and 90% or smaller, or a weight ratio of the silicon carbide to the aluminum nitride is 25/75 or greater and 75/25 or smaller is sintered, the amount of silicon carbide is balanced with the amount of the aluminum nitride, and the silicon carbide and the aluminum nitride tend to become in a solid solution state. In addition, since the silicon carbide and the aluminum nitride are dispersed homogeneously in molecule level, the silicon carbide and the aluminum nitride tend to become in a solid solution state. It is considered that a crystal structure of the silicon carbide is changed due to solid solution, and as a result, thermal conductivity of the ceramic sintered body is reduced.

Further, the present embodiment further includes a step of mixing composite powder, a phenol resin, and yttrium oxide. The phenol resin serves as a sintering aid of the silicon carbide powder, and the yttrium oxide serves as a sintering aid of the aluminum nitride powder. For this reason, sintering of the ceramic sintered body is promoted, which suppresses formation of pores. As a result, a denser ceramic sintered body can be produced.

Further, a ceramic sintered body having a thermal conductivity of 30 W/mK or smaller is obtained by the present embodiment. The ceramic sintered body can be preferably used as a heat insulating material when requiring any strength. The ceramic sintered body according to the present embodiment is not limited to a member constituting a semiconductive apparatus, and can be used in various fields.

(4) Comparative Evaluations

In order to investigate an effect of the present invention, the following comparative evaluations were performed. Further, the present invention is not limited to the following Examples.

(4. 1) Method of Manufacturing Ceramic Sintered Body of Examples and Comparative Examples The ceramic sintered body according to Examples and Comparative Examples was manufactured by the following method. Specifically, Examples 1 to 6 and Comparative Examples 1 and 2 each used the method of manufacturing ceramic sintered body according to the first embodiment. Examples 7 to 12 and Comparative Examples 3 and 4 each used the method of manufacturing a ceramic sintered body according to the second embodiment.

EXAMPLES 1 to 6

A silicon carbide precursor was produced by using ethyl silicate as a silicon-containing raw material and a phenol resin as a silicon carbide raw material. Firstly, 212 g of ethyl silicate and 94.5 g of phenol resin were mixed. 31.6 g of aqueous maleic acid solution (70% concentration) was added as a catalyst to the mixture. The mixture was mixed for 30 minutes while stirring to obtain a viscous material. The viscous material was allowed to dry on a hot plate at 110° C. As a result, a silicon carbide precursor was produced.

The resultant silicon carbide precursor was heated and calcined for six hours at 1900° C. under argon atmosphere. As a result, a silicon carbide powder was produced. The resultant silicon carbide powder was put into an atmospheric furnace and heated at 700° C. After heating, the silicon carbide powder was pulverized using a jet mill so as to have a center particle size of 1 to 2 μm.

A aluminum nitride precursor was produced using aluminum diisopropylate mono secondary butyrate (Al(O-iC$_3$H$_7$)$_2$ (o-secC$_4$H$_9$): AMD) as an aluminum nitride raw material and a phenol resin as a silicon carbide raw material. Firstly, 239.5 g of AMD and 39.5 g of phenol resin were mixed. 88 g of aqueous maleic acid solution (70% concentration) was added as a catalyst to the mixture. The mixture formed a viscous particulate material when hydrolysis was in progress. The viscous particulate material was allowed to dry on a hot plate at 110° C. As a result, an aluminum nitride precursor was produced.

The resultant aluminum nitride precursor was heated and calcined for six hours at 1900° C. under nitrogen atmosphere. As a result, an aluminum nitride powder was produced. The resultant aluminum nitride powder was put into an atmospheric furnace and heated at 700° C. After heating, the silicon carbide powder was pulverized using a jet mill so as to have a center particle size of 1 to 2 μm.

In Example 1, a slurry-like mixture was prepared such that a weight ratio of the aluminum nitride relative to a total weight ratio of the silicon carbide and the aluminum nitride contained in the ceramic sintered body was 10.6%. Specifically, 80.6 g of silicon carbide powder, 9.4 g of aluminum nitride powder, and 100 g of ethanol were mixed using a ball mill. As a result, a slurry-like mixture was prepared. In addition, the silicon carbide powder includes 9.5 g of phenol resin and the aluminum nitride powder includes 0.4 g of yttrium oxide.

The slurry-like mixture was allowed to dry on a hot plate at 110° C. The resultant composite powder thus dried was separated by 200 μm sieve. As a result, composite granule having a size smaller than 200 μm was obtained. 9 g of the resultant composite granule was injected into a graphite mold of φ30 mm. The graphite mold was placed in a heating furnace, and then sintered by hot pressing at a pressure of 300 kg/cm$^2$ for three hours at 2100° C. under argon atmosphere. As a result, a ceramic sintered body of Example 1 was obtained.

In Example 2, a slurry-like mixture was prepared such that a weight ratio of the aluminum nitride relative to a total weight ratio of the silicon carbide and the aluminum nitride contained in the ceramic sintered body was 26.3%. Specifically, 67.1 g of silicon carbide powder, 24.0 g of aluminum nitride powder, and 100 g of ethanol were mixed using a ball mill. A ceramic sintered body of Example 2 was obtained in a similar operation manner to Example 1, except for a weight ratio. In addition, the silicon carbide powder includes 7.9 g of phenol resin and the aluminum nitride powder includes 1.0 g of yttrium oxide.

In Example 3, a slurry-like mixture was prepared such that a weight ratio of the aluminum nitride relative to a total weight ratio of the silicon carbide and the aluminum nitride contained in the ceramic sintered body was 51.8%. Specifically, 44.8 g of silicon carbide powder, 48.0 g of aluminum nitride powder, and 100 g of ethanol were mixed using a ball mill. A ceramic sintered body of Example 3 was obtained in a similar operation manner to Example 1, except for a weight ratio. In addition, the silicon carbide powder includes 5.3 g of phenol resin and the aluminum nitride powder includes 2.0 g of yttrium oxide.

In Example 4, a slurry-like mixture was prepared such that a weight ratio of the aluminum nitride relative to a total weight ratio of the silicon carbide and the aluminum nitride contained in the ceramic sintered body was 76.3%. Specifically, 22.4 g of silicon carbide powder, 72.0 g of aluminum nitride powder, and 100 g of ethanol were mixed using a ball mill. A ceramic sintered body of Example 4 was obtained in a similar operation manner to Example 1, except for a weight ratio. In addition, the silicon carbide powder includes 2.6 g of phenol resin and the aluminum nitride powder includes 3.0 g of yttrium oxide.

In Example 5, a slurry-like mixture was prepared such that a weight ratio of the aluminum nitride relative to a total weight ratio of the silicon carbide and the aluminum nitride contained in the ceramic sintered body was 90.6%. Specifically, 9.0 g of silicon carbide powder, 86.4 g of aluminum nitride powder, and 100 g of ethanol were mixed using a ball mill. A ceramic sintered body of Example 5 was obtained in a similar operation manner to Example 1, except for a weight ratio. In addition, the silicon carbide powder includes 1.1 g of phenol resin and the aluminum nitride powder includes 3.6 g of yttrium oxide.

In Example 6, a slurry-like mixture was prepared such that a weight ratio of the aluminum nitride relative to a total weight ratio of the silicon carbide and the aluminum nitride contained in the ceramic sintered body was 95.3%. Specifically, 4.5 g of silicon carbide powder, 91.2 g of aluminum nitride powder, and 100 g of ethanol were mixed using a ball mill. A ceramic sintered body of Example 6 was obtained in a similar operation manner to Example 1, except for a weight ratio. In addition, the silicon carbide powder includes 0.5 g of phenol resin and the aluminum nitride powder includes 3.8 g of yttrium oxide.

EXAMPLES 7 to 12

A composite precursor was produced using ethyl silicate as a silicon-containing raw material, a phenol resin as a silicon carbide raw material, and aluminum diisopropylate mono secondary butyrate (Al(O-iC$_3$H$_7$)$_2$(o-secC$_4$H$_9$):AMD) as an aluminum-containing raw material. A ceramic sintered body of Example 7 was manufactured by the following method such that a weight ratio of the aluminum nitride relative to a total weight ratio of the silicon carbide and the aluminum nitride contained in the ceramic sintered body was 10.6%.

Firstly, 254.4 g of ethyl silicate and 113.4 g of phenol resin were mixed. 37.9 g of aqueous maleic acid solution (70% concentration) was added as a catalyst to the mixture. The mixture was mixed for 30 minutes while stirring to obtain a viscous material.

Subsequently, 32 g of AMD and 5.2 g of phenol resin were mixed with the viscous material. 11.8 g of aqueous maleic acid solution (70% concentration) was added as a catalyst to the mixture. The mixture formed a viscous particulate material when hydrolysis was in progress. The viscous particulate material was allowed to dry on a hot plate at 110° C. As a result, a composite precursor was produced.

The resultant composite precursor was heated and calcined at 1900° C. under nitrogen-containing argon atmosphere. As a result, a composite precursor was produced. The resultant composite powder was put into an atmospheric furnace and heated at 700° C. After heating, the composite powder was pulverized using a jet mill so as to have a center particle size of 1 to 2 μm.

100 g of composite powder, 8.8 g of phenol resin (10.5 wt % of silicon carbide contained in the composite powder), 1.0 g of yttrium oxide (4 wt % of aluminum nitride contained in the composite powder), and 100 g of ethanol were mixed using a ball mill to prepare a slurry-like mixture. The slurry-like mixture was allowed to dry on a hot plate at 110° C. The resultant composite powder thus dried was separated by 200 μm sieve. As a result, composite granule having a size less than 200 μm, which contained a sintering aid, was obtained.

9 g of the resultant composite granule was injected into a graphite mold of ϕ30 mm. The graphite mold was placed in a heating furnace, and then sintered by hot pressing at a pressure of 300 kg/cm$^2$ for three hours at 2100° C. under argon atmosphere. As a result, a ceramic sintered body of Example 10 was obtained.

In Example 8, a ceramic sintered body was manufactured such that a weight ratio of the aluminum nitride relative to a total weight ratio of the silicon carbide and the aluminum nitride contained in the ceramic sintered body was 26.3%. Specifically, 212 g of ethyl silicate and 94.5 g of phenol resin were mixed. 31.6 g of aqueous maleic acid solution (70% concentration) was added as a catalyst to the mixture. The mixture was mixed for 30 minutes while stirring to obtain a viscous material. Subsequently, 79.9 g of AMD and 13.1 g of phenol resin were mixed with the viscous material. 29.4 g of aqueous maleic acid solution (70% concentration) was added as a catalyst to the mixture. A composite powder was produced in a similar operation manner to Example 1 except for the aforementioned conditions. 100 g of the resultant composite powder, 7.9 g of phenol resin, 1.0 g of yttrium oxide, and 100 g of ethanol were mixed using a ball mill to prepare a slurry-like mixture. A ceramic sintered body was produced in a similar operation manner to Example 7 except for the aforementioned conditions.

In Example 9, a ceramic sintered body was manufactured such that a weight ratio of the aluminum nitride relative to a total weight ratio of the silicon carbide and the aluminum nitride contained in the ceramic sintered body was 51.8%. Specifically, 141.3 g of ethyl silicate and 63 g of phenol resin were mixed. 21.1 g of aqueous maleic acid solution (70% concentration) was added as a catalyst to the mixture. The mixture was mixed for 30 minutes while stirring to obtain a viscous material. Subsequently, 159.8 g of AMD and 26.2 g of phenol resin were mixed with the viscous material. 58.8 g of aqueous maleic acid solution (70% concentration) was added as a catalyst to the mixture. A composite powder was produced in a similar operation manner to Example 1 except for the aforementioned conditions. 100 g of the resultant composite powder, 5.3 g of phenol resin, 2.0 g of yttrium oxide, and 100 g of ethanol were mixed using a ball mill to prepare a slurry-like mixture. A ceramic sintered body was produced in a similar operation manner to Example 7 except for the aforementioned conditions.

In Example 10, a ceramic sintered body was manufactured such that a weight ratio of the aluminum nitride relative to a total weight ratio of the silicon carbide and the aluminum nitride contained in the ceramic sintered body was 76.3%. Specifically, 70.7 g of ethyl silicate and 31.5 g of phenol resin were mixed. 10.5 g of aqueous maleic acid solution (70% concentration) was added as a catalyst to the mixture. The mixture was mixed for 30 minutes while stirring to obtain a viscous material. Subsequently, 239.7 g of AMD and 39.3 g of phenol resin were mixed with the viscous material. 88.2 g of aqueous maleic acid solution (70% concentration) was added as a catalyst to the mixture. A composite powder was produced in a similar operation manner to Example 1 except for the aforementioned conditions. 100 g of the resultant composite powder, 2.6 g of phenol resin, 3.0 g of yttrium oxide, and 100 g of ethanol were mixed using a ball mill to prepare a slurry-like mixture. A ceramic sintered body was produced in a similar operation manner to Example 7 except for the aforementioned conditions.

In Example 11, a ceramic sintered body was manufactured such that a weight ratio of the aluminum nitride relative to a total weight ratio of the silicon carbide and the aluminum nitride contained in the ceramic sintered body was 90.6%. Specifically, 28.3 g of ethyl silicate and 12.6 g of phenol resin were mixed. 4.2 g of aqueous maleic acid solution (70% concentration) was added as a catalyst to the mixture. The mixture was mixed for 30 minutes while stirring to obtain a viscous material. Subsequently, 287.6 g of AMD and 47.2 g of phenol resin were mixed with the viscous material. 105.8 g of aqueous maleic acid solution (70% concentration) was added as a catalyst to the mixture. A composite powder was produced in a similar operation manner to Example 1 except for the aforementioned conditions. 100 g of the resultant composite powder, 1.1 g of phenol resin, 3.6 g of yttrium oxide, and 100 g of ethanol were mixed using a ball mill to prepare a slurry-like mixture. A ceramic sintered body was produced in a similar operation manner to Example 7 except for the aforementioned conditions.

In Example 12, a ceramic sintered body was manufactured such that a weight ratio of the aluminum nitride relative to a total weight ratio of the silicon carbide and the aluminum nitride contained in the ceramic sintered body was 95.3%. Specifically, 14.1 g of ethyl silicate and 6.3 g of phenol resin were mixed. 2.1 g of aqueous maleic acid solution (70% concentration) was added as a catalyst to the mixture. The mixture was mixed for 30 minutes while stirring to obtain a viscous material. Subsequently, 303.6 g of AMD and 49.8 g of phenol resin were mixed with the viscous material. 111.7 g of aqueous maleic acid solution (70% concentration) was added as a catalyst to the mixture. A composite powder was produced in a similar operation manner to Example 1 except for the aforementioned conditions. 100 g of the resultant composite powder, 0.5 g of phenol resin, 3.8 g of yttrium oxide, and 100 g of ethanol were mixed using a ball mill to prepare a slurry-like mixture. A ceramic sintered body was produced in a similar operation manner to Example 7 except for the aforementioned conditions.

COMPARATIVE EXAMPLES

In Comparative Example 1, a slurry-like mixture was prepared such that a weight ratio of the aluminum nitride relative to a total weight ratio of the silicon carbide and the aluminum nitride contained in the ceramic sintered body was 3.2%. Specifically, 86.8 g of silicon carbide powder, 2.9 g of aluminum nitride powder, and 100 g of ethanol were mixed using a ball mill. A ceramic sintered body of Comparative Example 1 was obtained in a similar operation manner to Example 1, except for a weight ratio. In addition, the silicon carbide powder includes 10.2 g of phenol resin and the aluminum nitride powder includes 0.1 g of yttrium oxide.

In Comparative Example 2, a slurry-like mixture was prepared such that a weight ratio of the aluminum nitride relative to a total weight ratio of the silicon carbide and the aluminum nitride contained in the ceramic sintered body was 97.2%. Specifically, 2.7 g of silicon carbide powder, 93.1 g of aluminum nitride powder, and 100 g of ethanol were mixed using a ball mill. A ceramic sintered body of Comparative Example 2 was obtained in a similar operation manner to Example 1, except for a weight ratio. In addition, the silicon carbide powder includes 0.3 g of phenol resin and the aluminum nitride powder includes 3.9 g of yttrium oxide.

In Comparative Example 3, a ceramic sintered body was manufactured such that a weight ratio of the aluminum nitride relative to a total weight ratio of the silicon carbide and the aluminum nitride contained in the ceramic sintered body was 3.2%. Specifically, 274.2 g of ethyl silicate and 122.2 g of phenol resin were mixed. 40.8 g of aqueous maleic acid solution (70% concentration) was added as a catalyst to the mixture. The mixture was mixed for 30 minutes while stirring to obtain a viscous material. Subsequently, 9.6 g of AMD and 1.6 g of phenol resin were mixed with the viscous material. 3.5 g of aqueous maleic acid solution (70% concentration) was added as a catalyst to the mixture. A composite powder was produced in a similar operation manner to Example 1 except for the aforementioned conditions. 100 g of the resultant composite powder, 10.2 g of phenol resin, 0.1 g of yttrium oxide, and 100 g of ethanol were mixed using a ball mill to prepare a slurry-like mixture. A ceramic sintered body was produced in a similar operation manner to Example 7 except for the aforementioned conditions.

In Comparative Example 4, a ceramic sintered body was manufactured such that a weight ratio of the aluminum nitride relative to a total weight ratio of the silicon carbide and the aluminum nitride contained in the ceramic sintered body was 97.2%. Specifically, 8.5 g of ethyl silicate and 3.8 g of phenol resin were mixed. 1.3 g of aqueous maleic acid solution (70% concentration) was added as a catalyst to the mixture. The mixture was mixed for 30 minutes while stirring to obtain a viscous material. Subsequently, 310.0 g of AMD and 50.8 g of phenol resin were mixed with the viscous material. 114.1 g of aqueous maleic acid solution (70% concentration) was added as a catalyst to the mixture. A composite powder was produced in a similar operation manner to Example 1 except for the aforementioned conditions. 100 g of the resultant composite powder, 0.3 g of phenol resin, 3.9 g of yttrium oxide, and 100 g of ethanol were mixed using a ball mill to prepare a slurry-like mixture. A ceramic sintered body was produced in a similar operation manner to Example 7 except for the aforementioned conditions.

Comparative Examples 5 to 7 used commercially available silicon carbide powder (manufactured by Bridgestone Corporation) and aluminum nitride powder (AlN-E powder, manufacture by Tokuyama Corporation). That is, Comparative Examples 5 to 7 used silicon carbide powder and aluminum nitride powder prepared without a silicon carbide precursor and an aluminum nitride precursor.

In Comparative Example 5, a slurry-like mixture was prepared such that a weight ratio of the aluminum nitride relative to a total weight ratio of the silicon carbide and the aluminum nitride contained in the ceramic sintered body was 1.1%. A ceramic sintered body of Comparative Example 5 was obtained in a similar operation manner to Example 1, except for silicon carbide powder, aluminum nitride powder, and a weight ratio.

In Comparative Example 6, a slurry-like mixture was prepared such that a weight ratio of the aluminum nitride relative to a total weight ratio of the silicon carbide and the aluminum nitride contained in the ceramic sintered body was 10.6%. A ceramic sintered body of Comparative Example 6 was obtained in a similar operation manner to Example 1, except for silicon carbide powder, aluminum nitride powder, and a weight ratio.

In Comparative Example 7, a slurry-like mixture was prepared such that a weight ratio of the aluminum nitride relative to a total weight ratio of the silicon carbide and the aluminum nitride contained in the ceramic sintered body was 31.5%. A ceramic sintered body of Comparative Example 7 was obtained in a similar operation manner to Example 1, except for silicon carbide powder, aluminum nitride powder, and a weight ratio.

(4. 2) Measurement

Figure 4:
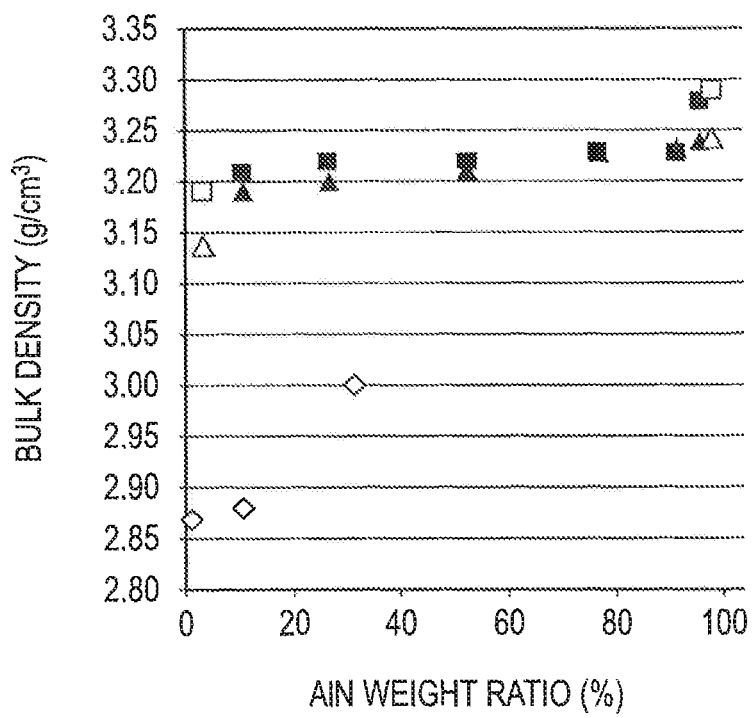
FIG. 4 is a graph of bulk density according to Examples and Comparative Examples.
Figure 5:
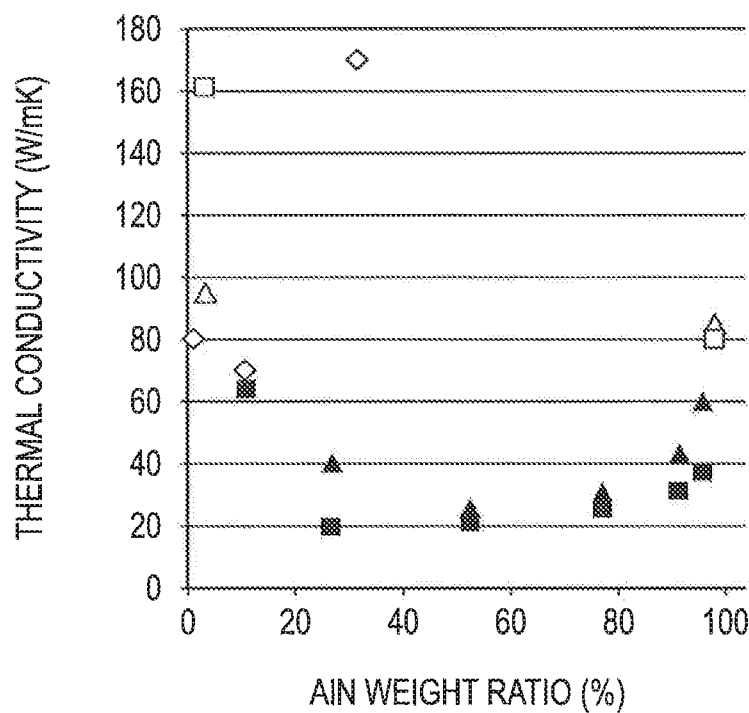
FIG. 5 is a graph of thermal conductivity according to Examples and Comparative Examples.
Figure 6:
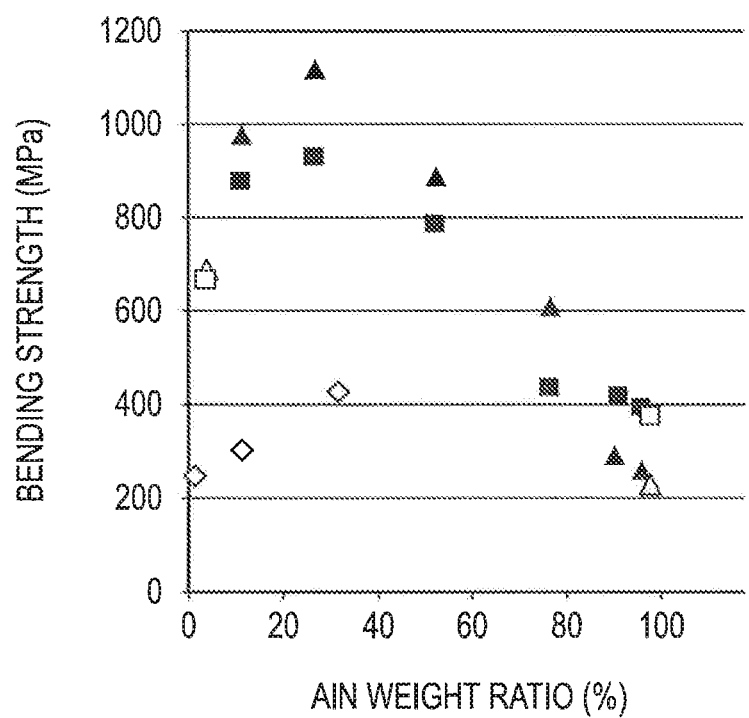
FIG. 6 is a graph of bending strength according to Examples and Comparative Examples.
Figure 7:
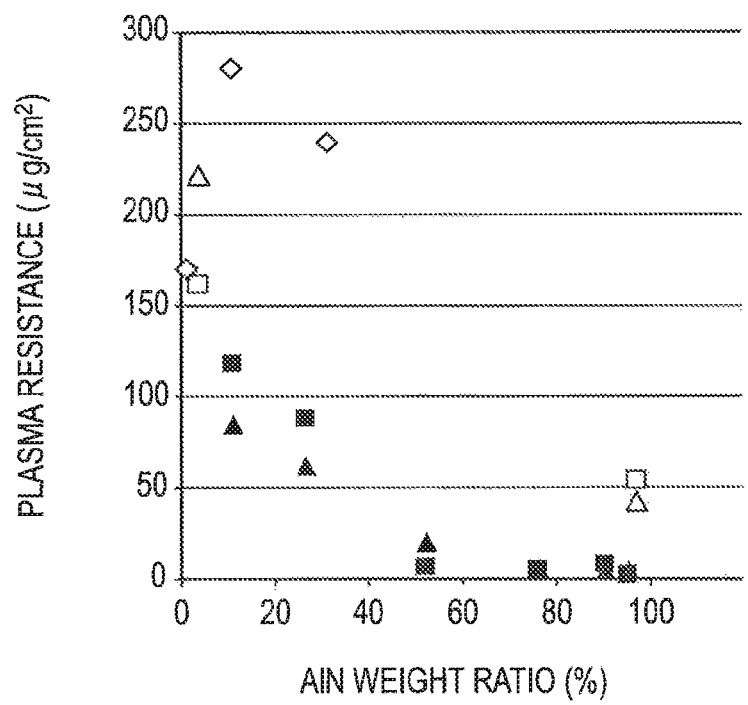
FIG. 7 is a graph of plasma resistance according to Examples and Comparative Examples.

Bulk density, thermal conductivity, bending strength, and plasma resistance were measured using the ceramic sintered body manufactured by the aforementioned method. Results are shown in Table 1 and FIGS. 4 to 7. FIG. 4 is a graph of bulk density according to Examples and Comparative Examples. FIG. 5 is a graph of thermal conductivity according to Examples and Comparative Examples. FIG. 6 is a graph of bending strength according to Examples and Comparative Examples. FIG. 7 is a graph of plasma resistance according to Examples and Comparative Examples.

In FIGS. 4 to 7, Examples 1 and 6 each manufactured by using the production method according to the first embodiment are indicated by "▲". Examples 7 and 12 manufactured by using the production method according to the second embodiment are indicated by "■". Comparative Examples 1 and 2 manufactured by using the production method according to the first embodiment are indicated by "Δ". Comparative Examples 3 and 4 manufactured by using the production method according to the second embodiment are indicated by "□". Comparative Examples 5 to 7 are indicated by "◇".

Bulk density was calculated from a porosity by using the Archimedes method. Results are shown in Table 1 and FIG. 4.

Thermal conductivity was measured by using each of the ceramic sintered bodies processed in a size of φ10 mm×t1 mm. Results are shown in Table 1 and FIG. 5.

Bending strength was measured by using each of the ceramic sintered bodies processed and polished in a size of 4 mm×3 mm×26 mm. A ceramic sintered body that was a cuboid of 4 mm long, 3 mm wide, and 26 mm high was prepared. The prepared ceramic sintered body was subjected to three point bending test in a condition of a crosshead speed of 5 mm/min and a distance between spans of 20 mm, and then bending strength thereof was measured. Specifically, each of the ceramic sintered bodies was supported by two points with an interval of 20 mm. Each ceramic sintered body was pressurized from the pressing surface which was the side opposite to the support surface, which comes in contact with the two points. The pressure was applied at the center of two points such that a load was homogeneously distributed at the two points. Results are shown in Table 1 and FIG. 6.

With respect to measurement of plasma resistance, the amount ($\mu g/cm^2$) of the ceramic sintered body to be worn at the time of irradiation for one hour in a condition of $CF4/O^2=100/100$ sccm, 500 W, and 50 Pa was measured. The less the wear amount, the more excellent the plasma resistance. Results are shown in Table 1 and FIG. 7.

TABLE 1

|  | First embodiment | Second embodiment | SiC weight ratio (wt %) | AlN weight ratio (wt %) | Bulk density ($g/cm^3$) | Thermal conductivity (W/mk) | Bending strength (MPa) | Plasma resistance ($\mu g/cm^2$) |
| --- | --- | --- | --- | --- | --- | --- | --- | --- |
| Comp. Ex. 1 | ○ | — | 96.8 | 3.2 | 3.14 | 95 | 686 | 222 |
| Ex. 1 | ○ | — | 89.4 | 10.6 | 3.19 | 65 | 977 | 85 |
| Ex. 2 | ○ | — | 73.7 | 26.3 | 3.20 | 39 | 1117 | 62 |
| Ex. 3 | ○ | — | 48.2 | 51.8 | 3.21 | 25 | 888 | 19 |

TABLE 1-continued

|  | First embodiment | Second embodiment | SiC weight ratio (wt %) | AlN weight ratio (wt %) | Bulk density (g/cm$^3$) | Thermal conductivity (W/mk) | Bending strength (MPa) | Plasma resistance (μg/cm$^2$) |
|---|---|---|---|---|---|---|---|---|
| Ex. 4 | ○ | — | 23.7 | 76.3 | 3.23 | 31 | 611 | 6 |
| Ex. 5 | ○ | — | 9.4 | 90.6 | 3.23 | 43 | 289 | 5 |
| Ex. 6 | ○ | — | 4.7 | 95.3 | 3.24 | 60 | 258 | 4 |
| Comp. Ex. 2 | ○ | — | 2.8 | 97.2 | 3.24 | 85 | 232 | 42 |
| Comp. Ex. 3 | — | ○ | 96.8 | 3.2 | 3.19 | 161 | 663 | 161 |
| Ex. 7 | — | ○ | 89.4 | 10.6 | 3.21 | 64 | 876 | 118 |
| Ex. 8 | — | ○ | 73.7 | 26.3 | 3.22 | 19 | 929 | 88 |
| Ex. 9 | — | ○ | 48.2 | 51.8 | 3.22 | 21 | 781 | 6 |
| Ex. 10 | — | ○ | 23.7 | 76.3 | 3.23 | 25 | 434 | 5 |
| Ex. 11 | — | ○ | 9.4 | 90.6 | 3.23 | 31 | 417 | 8 |
| Ex. 12 | — | ○ | 4.7 | 95.3 | 3.28 | 37 | 389 | 1 |
| Comp. Ex. 4 | — | ○ | 2.8 | 97.2 | 3.29 | 80 | 375 | 53 |
| Comp. Ex. 5 | — | — | 98.9 | 1.1 | 2.87 | 80 | 250 | 170 |
| Comp. Ex. 6 | — | — | 89.4 | 10.6 | 2.88 | 70 | 300 | 280 |
| Comp. Ex. 7 | — | — | 68.5 | 31.5 | 3.00 | 170 | 430 | 240 |

(4. 3) Result

As shown in Table 1 and FIG. 4, the ceramic sintered body according to Examples 1 to 12 had a bulk density greater than 3.18 g/cm$^3$. The ceramic sintered body according to Comparative Examples 1 and 5 to 7 had a bulk density of 3.18 g/cm$^3$ or smaller. Therefore, it was found that the ceramic sintered body in which (weight ratio of AlN)/(weight ratio of SiC+weight ratio of AlN) was greater than 10 and 97% or smaller had a bulk density greater than 3.18 g/cm$^3$. It was found that the ceramic sintered body in which (weight ratio of AlN)/(weight ratio of SiC+weight ratio of AlN) was 10.6% or smaller and 95.3% or smaller had a bulk density greater than 3.18 g/cm$^3$.

Further, it was found that the ceramic sintered body in which (weight ratio of AlN)/(weight ratio of SiC+weight ratio of AlN) was greater than 52% and 97% or smaller had a bulk density greater than 3.23 g/cm$^3$. It was found that the ceramic sintered body in which (weight ratio of AlN)/(weight ratio of SiC+weight ratio of AlN) was greater than 76% and smaller than 96% had a bulk density greater than 3.23 g/cm$^3$. It was found that the ceramic sintered body in which (weight ratio of AlN)/(weight ratio of SiC+weight ratio of AlN) was 76.3% or greater and 95.3% or smaller had a bulk density greater than 3.23 g/cm$^3$.

As shown in Table 1 and FIG. 5, the ceramic sintered body according to Examples 1 to 12 had a thermal conductivity of 65 W/mK or smaller. The ceramic sintered body according to Comparative Examples 1 and 5 to 7 had a thermal conductivity greater than 65 W/mK. Therefore, it was found that the ceramic sintered body in which (weight ratio of AlN)/(weight ratio of SiC+weight ratio of AlN) was greater than 10% and 97% or smaller had a thermal conductivity of 65 W/mK or smaller. It was found that the ceramic sintered body in which (weight ratio of AlN)/(weight ratio of SiC+weight ratio of AlN) was 10.6% or smaller and 95.3% or smaller had a thermal conductivity of 65 W/mK or smaller.

Further, it was found that the ceramic sintered body in which (weight ratio of AlN)/(weight ratio of SiC+weight ratio of AlN) was 11% or greater and 90% or smaller had a thermal conductivity of 40 W/mK or smaller. It was found that the ceramic sintered body in which (weight ratio of AlN)/(weight ratio of SiC+weight ratio of AlN) was greater than 26% and smaller than 77% had a thermal conductivity of 40 W/mK or smaller. It was found that the ceramic sintered body in which (weight ratio of AlN)/(weight ratio of SiC+weight ratio of AlN) was 26.3% or greater and 76.3% or smaller had a thermal conductivity of 40 W/mK or smaller.

As shown in Table 1 and FIG. 6, the ceramic sintered body according to Examples 1 to 3 and 7 to 9 had a bending strength of 700 MPa or greater. Therefore, it was found that the ceramic sintered body in which (weight ratio of AlN)/(weight ratio of SiC+weight ratio of AlN) was greater than 10% and 76% or smaller had a bending strength of 700 MPa or greater. It was found that the ceramic sintered body in which (weight ratio of AlN)/(weight ratio of SiC+weight ratio of AlN) was greater than 10% and smaller than 52% had a bending strength of 700 MPa or greater. It was found that the ceramic sintered body in which (weight ratio of AlN)/(weight ratio of SiC+weight ratio of AlN) was 10.6% or greater and 51.8% or smaller had a bending strength of 700 MPa or greater.

As shown in Table 1 and FIG. 7, the ceramic sintered body according to Examples 3 to 6 and 9 to 12 had a wear amount of 20 μg/cm$^2$ or less. Therefore, it was found that the ceramic sintered body in which (weight ratio of AlN)/(weight ratio of SiC+weight ratio of AlN) was 27% or greater and 97% or smaller had a wear amount of 20 μg/cm$^2$ or less. It was found that the ceramic sintered body in which (weight ratio of AlN)/(weight ratio of SiC+weight ratio of AlN) was greater than 51% and smaller than 96% had a wear amount of 20 μg/cm$^2$ or less. It was found that the ceramic sintered body in which (weight ratio of AlN)/(weight ratio of SiC+weight ratio of AlN) was 51.8% or greater and 95.3% or smaller had a wear amount of 20 μg/cm$^2$ or less.

Further, it was found that the ceramic sintered body in which (weight ratio of AlN)/(weight ratio of SiC+weight ratio of AlN) was 52% or greater and 97% or smaller had a wear amount less than 10 μg/cm$^2$. It was found that the ceramic sintered body in which (weight ratio of AlN)/(weight ratio of SiC+weight ratio of AlN) was greater than 76% and smaller than 96% had a wear amount less than 10 μg/cm$^2$. It was found that the ceramic sintered body in which (weight ratio of AlN)/(weight ratio of SiC+weight ratio of AlN) was 76.3% or greater and 95.3% or smaller had a wear amount less than 10 μg/cm$^2$.

From the above, it was found that the ceramic sintered body according to the present invention had a high bulk density and excellent insulation.

As shown in Table 1, the ceramic sintered body of Examples 1 to 3 manufactured by the production method according to the first embodiment had a bending strength of 800 MPa or greater and plasma resistance smaller than 100 μg/cm$^2$. Therefore, it was found that the ceramic sintered body of Examples 1 to 3 in which (weight ratio of AlN)/

(weight ratio of SiC+weight ratio of AlN) was greater than 10% and smaller than 76%, manufactured by the production method according to the first embodiment had a high strength and excellent plasma resistance. It was found that the ceramic sintered body of Examples 1 and 2 in which (weight ratio of AlN)/(weight ratio of SiC+weight ratio of AlN) was greater than 10% and smaller than 51% had a bending strength of 900 MPa or greater and excellent strength.

As shown in Table 1, it was found that the ceramic sintered body of Examples 9 to 11 manufactured by the production method according to the second embodiment had a bending strength of 400 MPa or greater and a thermal conductivity of 10 W/mK or smaller. Therefore, it was found that the ceramic sintered body of Examples 9 to 11 in which (weight ratio of AlN)/(weight ratio of SiC+weight ratio of AlN) was greater than 27% and smaller than 94%, manufactured by the production method according to the first embodiment had a high strength and excellent insulation.

(4. 4) XRD Diffraction Measurement

Figure 8:
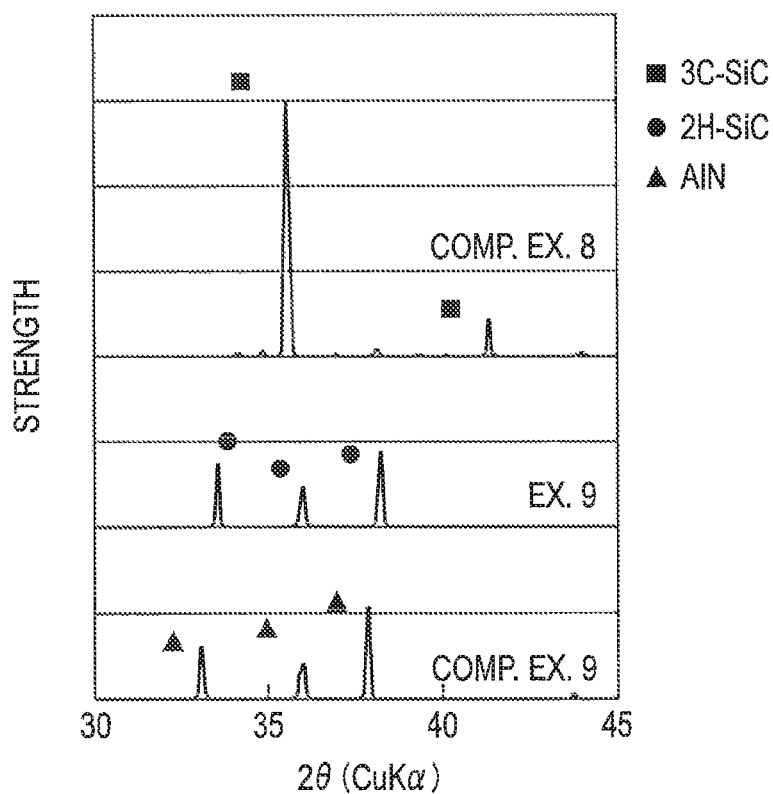
FIG. 8 is data showing a result of XRD diffraction of Example 9 and Comparative Examples 8 and 9.

FIG. 8 shows a result of XRD diffraction of Example 9 and Comparative Examples 8 and 9.

In Comparative Example 8, a ceramic sintered body was prepared by using only silicon carbide powder such that a weight ratio of the aluminum nitride relative to a total weight ratio of the silicon carbide and the aluminum nitride contained in the ceramic sintered body was 0%. Further, Comparative Example 8 used silicon carbide powder obtained from a silicon carbide precursor produced by mixing a silicon source and a carbon source. Specifically, ethyl silicate, a phenol resin, and an aqueous maleic acid solution were mixed to produce a silicon carbide precursor. The resultant silicon carbide precursor may be heated and calcined under argon atmosphere to obtain silicon carbide powder. A phenol resin and ethanol were added to the resultant silicon carbide powder to prepare a slurry-like mixture using a ball mill. A ceramic sintered body was obtained in a similar operation manner to Example 1 by using mixed powder obtained from the slurry-like mixture.

In Comparative Example 9, a ceramic sintered body was prepared by using only aluminum nitride powder such that a weight ratio of the aluminum nitride relative to a total weight ratio of the silicon carbide and the aluminum nitride contained in the ceramic sintered body was 100%. Further, Comparative Example 9 used silicon carbide powder obtained from a nitride aluminum precursor produced by mixing an aluminum nitride source and a carbon source. Specifically, AMD, a phenol resin, and an aqueous maleic acid solution were mixed to produce an aluminum nitride precursor. The resultant nitride aluminum precursor may be heated and calcined under nitrogen atmosphere to obtain aluminum nitride powder. Yttrium oxide and ethanol were added to the resultant aluminum nitride powder to prepare a slurry-like mixture using a ball mill. A ceramic sintered body was obtained in a similar operation manner to Example 1 by using mixed powder obtained from the slurry-like mixture.

In a case of Comparative Example 8 (only silicon carbide powder), a 3C-SiC peak was observed. In a case of Comparative Example 9 (only aluminum nitride powder), an AlN peak was observed. Meanwhile, in a case of Example 9 manufactured from silicon carbide powder and aluminum nitride powder, a 2H-SiC peak was observed. This indicates that the silicon carbide and the aluminum nitride were in a solid solution state. It is considered that the sintered body of Example 9 has smaller thermal conductivity, because silicon carbide and aluminum nitride are in a solid solution state so that a crystal structure of silicon carbide may be changed. It is considered that the sintered body of other Examples also has smaller thermal conductivity, because silicon carbide and aluminum nitride are in a solid solution state so that a crystal structure of silicon carbide may be changed.

As described above, it is of course that the present invention includes various embodiments and the like not described herein. Therefore, the scope of the present invention is to be defined only by the inventive specific matter according to the adequate claims from the above description.

Note that the entire contents of the Japanese Patent Application No. 2011-095255 (filed on Apr. 21, 2011) and the Japanese Patent Application No. 2011-095297 (filed on Apr. 21, 2011) are incorporated herein by reference.

Industrial Applicability

According to the present invention, it is possible to provide a composite ceramic sintered body containing silicon carbide and aluminum nitride, which has high bulk density and excellent insulation, and a method of manufacturing the ceramic sintered body.

The invention claimed is:

1. A method of manufacturing a ceramic sintered body containing silicon carbide and aluminum nitride, comprising:
a step of mixing a silicon-containing raw material containing a liquid silicon compound, a carbon-containing raw material containing an organic compound which produces carbon by heating, an aluminum-containing raw material containing a hydrolyzable aluminum compound, and water, to produce a composite precursor;
a step of heating and calcining the composite precursor under inert atmosphere containing nitrogen, to produce composite powder containing silicon carbide and aluminum nitride; and
a step of sintering the composite powder, wherein
a weight ratio of the aluminum nitride relative to a total weight ratio of the silicon carbide and the aluminum nitride contained in the composite powder is greater than 10% and 97% or smaller.

2. The method of manufacturing a ceramic sintered body according to claim 1, wherein
a weight ratio of the aluminum nitride to the sum of the silicon carbide and the aluminum nitride contained in the composite powder is higher than 11% and 90% or lower.

3. The method of manufacturing a ceramic sintered body according to claim 1, further comprising:
a step of mixing the composite powder, a phenol resin, and yttrium oxide.

4. The method of manufacturing a ceramic sintered body according to claim 1, wherein the liquid silicon compound is alkoxysilane.

5. The method of manufacturing a ceramic sintered body according to claim 1, wherein the ceramic sintered body has a thermal conductivity of 30 W/mK or smaller.

* * * * *